(12) United States Patent
de Silva et al.

(10) Patent No.: US 7,519,469 B2
(45) Date of Patent: Apr. 14, 2009

(54) DISPLAY METHOD AND APPARATUS FOR NAVIGATION SYSTEM

(75) Inventors: Andrew S. de Silva, Torrance, CA (US); Maung W. Han, Torrance, CA (US)

(73) Assignee: Alpine Electronics, Inc., Tokyo (JP)

(*) Notice: Subject to any disclaimer, the term of this patent is extended or adjusted under 35 U.S.C. 154(b) by 643 days.

(21) Appl. No.: 11/117,241

(22) Filed: Apr. 28, 2005

(65) Prior Publication Data
US 2006/0247855 A1 Nov. 2, 2006

(51) Int. Cl.
*G01C 21/00* (2006.01)
(52) U.S. Cl. .............. 701/200; 701/208; 701/209; 701/212; 345/619; 340/995.17; 348/650
(58) Field of Classification Search ......... 701/211–212, 701/208; 340/995.1, 995.14–17, 988, 995.17, 340/990; 348/650, 113; 345/619
See application file for complete search history.

(56) References Cited

U.S. PATENT DOCUMENTS

| | | | | |
|---|---|---|---|---|
| 5,745,866 | A * | 4/1998 | Steiner | 701/200 |
| 6,631,322 | B1 * | 10/2003 | Arthur et al. | 701/211 |
| 6,836,723 | B2 * | 12/2004 | de Silva | 701/200 |
| 6,882,350 | B2 * | 4/2005 | Asami | 345/638 |
| 7,046,285 | B2 * | 5/2006 | Miyagi et al. | 348/333.05 |
| 7,096,211 | B2 * | 8/2006 | Fujihara | 706/58 |
| 2002/0078035 | A1 * | 6/2002 | Frank et al. | 707/3 |
| 2003/0201914 | A1 * | 10/2003 | Fujiwara et al. | 340/995.24 |
| 2004/0012506 | A1 * | 1/2004 | Fujiwara et al. | 340/995.1 |
| 2004/0107043 | A1 * | 6/2004 | de Silva | 701/200 |
| 2005/0156945 | A1 * | 7/2005 | Asami | 345/619 |
| 2005/0207672 | A1 * | 9/2005 | Bernardo et al. | 382/284 |
| 2006/0247855 | A1 * | 11/2006 | de Silva et al. | 701/212 |

(Continued)

FOREIGN PATENT DOCUMENTS

JP 2000146751 A * 5/2000

(Continued)

OTHER PUBLICATIONS

Interaction with geoscience data in an immersive environment; Ching-Rong Lin; Loftin, R.B.; Nelson, H.R., Jr.; Virtual Reality, 2000. Proceedings. IEEE; Mar. 18-22, 2000 pp. 55-62; Digital Object Identifier 10.1109/VR.2000.840363.*

(Continued)

*Primary Examiner*—Cuong H Nguyen
(74) *Attorney, Agent, or Firm*—Muramatsu & Associates

(57) ABSTRACT

A navigation system is designed to scale a map image such that a redrawn map image shows an icon of the most relevant object at a center of a cursor when the scale of the map image is changed so that the user will not lose sight of the most relevant object such as an icon showing a destination. The navigation system prioritizes an icon representing a particular object based on a predetermined priority order and changes the position of the map image so that the icon of the highest priority comes to the center of the cursor when the map scale is changed. Thus, the icon of the highest priority always remains at the center of the cursor, thereby preventing from loosing the sight of the icon of the highest priority when zooming in the map image.

20 Claims, 10 Drawing Sheets

U.S. PATENT DOCUMENTS

2008/0091349 A1* 4/2008 Liu ............................ 701/211
2008/0167811 A1* 7/2008 Geelen ....................... 701/212

FOREIGN PATENT DOCUMENTS

| JP | 2003-240564 | | 8/2003 |
|---|---|---|---|
| JP | 2006171469 A | * | 6/2006 |
| JP | 2006251720 A | * | 9/2006 |
| JP | 2007220047 A | * | 8/2007 |
| JP | 2007249095 A | * | 9/2007 |

OTHER PUBLICATIONS

The effects of dynamic updating of tactical information on situation awareness and performance in an attack helicopter domain Entin, E.B.; Systems, Man, and Cybernetics, 1998. 1998 IEEE International Conference on; vol. 4, Oct. 11-14, 1998 pp. 3602-3607 vol. 4; Digital Object Identifier 10.1109/ICSMC.1998.726625.*

Content-based indexing of multimedia databases; Jian-Kang Wu; Knowledge and Data Engineering, IEEE Transactions on; vol. 9, Issue 6, Nov.-Dec. 1997 pp. 978-989; Digital Object Identifier 10.1109/69.649320.*

Engineering a human factor-based geographic user interface; Elvins, T.T.; Jain, R.; Computer Graphics and Applications, IEEE vol. 18, Issue 3, May-Jun. 1998 pp. 66-77; Digital Object Identifier 10.1109/38.674974.*

Image-based interactive exploration of real-world environments; Uyttendaele, M.; Criminisi, A.; Kang, S.B.; Winder, S.; Szeliski, R.; Hartley, R.; Computer Graphics and Applications, IEEE; vol. 24, Issue 3, May-Jun. 2004 pp. 52-63; Digital Object Identifier 10.1109/MCG.2004.1297011.*

Understanding Images of Graphical User Interfaces: A New Approach to Activity Recognition for Visual Surveillance; Li Yu; Boult, T.E.; Computer Vision and Pattern Recognition Workshop, 2004 Conference on; 27-02 Jun. 2004 pp. 113-113; Digital Object Identifier 10.1109/CVPR.2004.196.*

A visual user interface for map information retrieval based on semantic significance; Tanaka, M.; Ichikawa, T.; Software Engineering, IEEE Transactions on; vol. 14, Issue 5, May 1988 pp. 666-670; Digital Object Identifier 10.1109/32.6144.*

Design and test of military cockpits; Bruce, S.; Rice, C.; Hepp, R.; Aerospace Conference, 1998. Proceedings., IEEE vol. 3, Mar. 21-28, 1998 pp. 5-14 vol. 3; Digital Object Identifier 10.1109/AERO.1998.685676.*

* cited by examiner

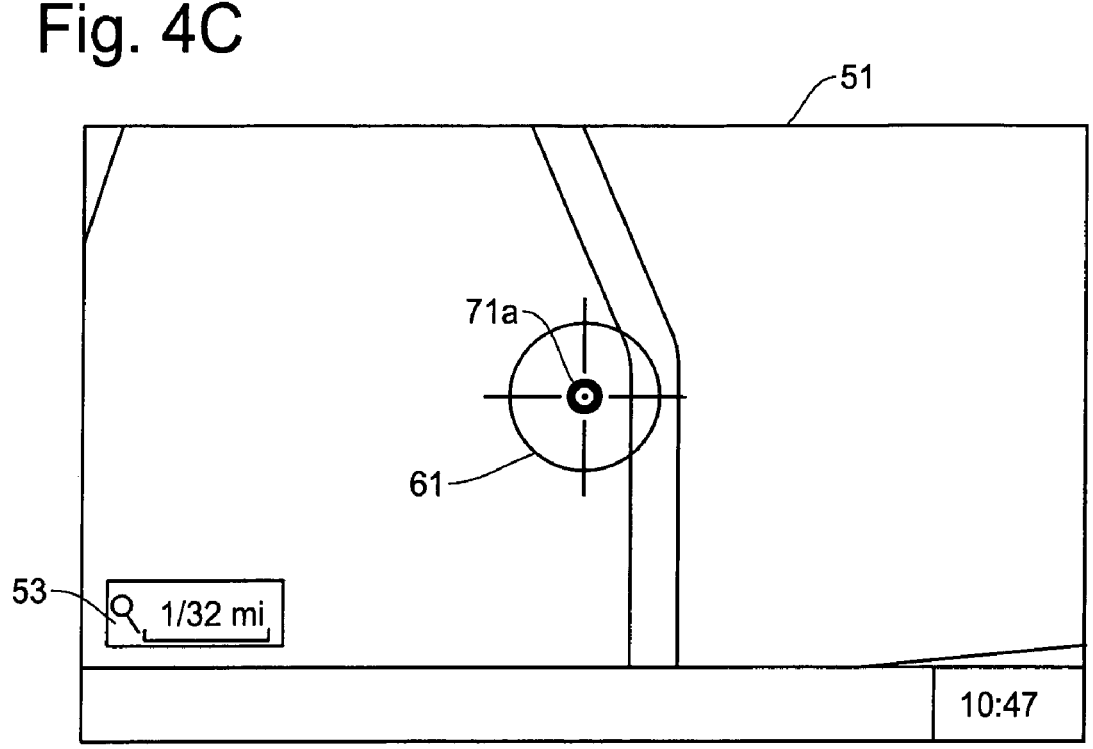

| | |
|---|---|
| 1 | Destination Point |
| 2 | Traffic Incident |
| 3 | Road Segment |
| 4 | Point of Interest |
| 5 | Freeway Shield |
| 6 | Freeway Exit |
| 7 | City Name |
| 8 | Map Polygon |

DISPLAY METHOD AND APPARATUS FOR NAVIGATION SYSTEM

FIELD OF THE INVENTION

This invention relates to a display method and apparatus for a navigation system to redraw a map image in a map scale change operation, and more particularly, to a display method and apparatus for a navigation system to adjust a position of a map image so that an icon of the most relevant object will be displayed at the center of a cursor on the display screen when the map image is enlarged.

BACKGROUND OF THE INVENTION

A navigation system performs travel guidance for enabling a user to easily and quickly reach the selected destination. A typical example is a vehicle navigation system where a vehicle of a user is equipped with a navigation function to guide the user to a destination. Such a navigation system detects the current position of the user or user's vehicle, and reads out map data pertaining to an area at the current vehicle position from a map data storage medium, for example, a hard disk or a DVD. The navigation system displays a map image on a monitor screen while superimposing a mark representing the current location of the user and the route to the destination thereon.

When a destination is set, the navigation system starts a route guidance function for setting a guided route from the start point to the destination. To determine the guided route to the destination, the navigation system calculates and determines an optimum route to the destination based on various parameters. For example, the guided route is determined based on the shortest way to reach the destination, the quickest way to reach the destination, the route preferring freeways to surface roads, the least expensive way to the destination, the route without using toll road, or the like.

Typically, a navigation system can display a map image with several icons. Such icons have various shapes and colors to represent corresponding objects such as types of points of interest (POI), a destination point, traffic incidents, freeway exits, etc. As is well known in the art, the recent map data used in a navigation system includes information on a large number of points of interest (POI), such as restaurants, shops, gas stations, etc. Thus, a large number of icons will be displayed on a small area of map image when displaying a map image of an area condensed with POIs, such as a downtown or commercial areas such as shopping malls. For the user can easily observe on the monitor screen, the sizes of such icons must not be too small.

Accordingly, in many cases, many icons are displayed on the map image to provide sufficient information to the user. Typically, the user can change the scale of the map by zooming in or zooming out the map image to know the surrounding situation better. By zooming in, the user can see more details of a smaller area. By zooming out, the user can see a wider area with less detail. Thus, depending on the user's needs, the map scale is frequently changed by means of a remote controller, a touch screen, etc.

FIG. 1 is a display example in a conventional navigation system showing a map image with several icons. A display 51 contains a map image having several roads and other information. A cursor 61 is typically positioned at the center of the display screen. A destination icon 71a, point of interest icons 71b-71f, and traffic incident icons 71g and 71h are shown on the map image. A scale indicator 53 at the lower left indicates the current scale of the map image. In this display example, the scale of the map is ⅛ miles per unit length.

When the user zooms in the map image, the navigation system will display a magnified view of the map image. Such an example is shown in the display example in FIG. 2. As shown in the map scale indicator 53, the map scale is changed to ¹⁄₃₂ miles per unit length so as to enlarge the map image. When zooming in or out in this manner, typically, the navigation system magnifies or shrinks the map image while keeps positioning the cursor 61 at the center. In other words, the map image is either enlarged or shrunken with respect to the cursor point.

When enlarging the map image at the cursor point 61 as in the example shown in FIG. 2, the icons 71a and 71d-71f and 71h shown in FIG. 1 are not displayed on the screen of FIG. 2 because these icons are outside of the display area. In many cases, the user wishes to zoom in an area with respect to a certain incident or place that is most relevant to the user's situation. For example, in enlarging the map image of FIG. 1 to the one in FIG. 2, the user often wants to see the details around the destination 71b to know the shops and restaurants close to the destination or details of road structures close to the destination. However, as shown in FIG. 2, the destination icon 71a is not displayed, because the destination icon 71a is away from the center of the cursor 61 when the zoom in rate (rate of map scale change) is large.

Thus, there is a need to provide a navigation system that can rearrange a map image upon user's preference to zoom in or zoom out by taking the relevancy of objects for the user into consideration and adjusting the position of the object to the center of the cursor.

SUMMARY OF THE INVENTION

It is, therefore, an object of the present invention to provide a method and apparatus for a navigation system which is able to adjust a location of an icon representing a particular object or a type of object to a cursor center position when a map scale is changed.

It is another object of the present invention to provide a method and apparatus for a navigation system which is able to prioritize an icon representing a particular object or a type of object and change the position of a map image so that the icon of highest priority comes to the cursor center when the map scale is changed.

It is a further object of the present invention to provide a method and apparatus for a navigation system which is able to prioritize an icon which is closet to the cursor center when two or more icons of the same degree of priority exist within a cursor range and change the position of the map image so that the icon of highest priority comes to the cursor center when the map scale is changed.

One aspect of the present invention is a display method for a navigation system for displaying icons on a map image when a map scale is changed. The display method is comprised of: receiving a request for changing a map image on a navigation system by a specified map scale; determining whether an icon representing a relevant object exists within a cursor range defined by a cursor on the map image; selecting an icon representing a highest priority object based on a predetermined order of priority; retrieving position data indicating a location of the highest priority object from map data; and adjusting a position of the map image so that the selected icon representing the highest priority object comes to a center of the cursor based on the position data, and displaying the map image with the requested map scale.

In the method of the present invention, the priority of objects represented by the icons is predetermined by the navigation system or by an operation of a user. The icon that is closest to the center of the cursor is selected when two or more icons of the same priority exist within the cursor range. Alternatively, the icon that is most relevant to a trip to a destination is selected to be moved to the center of the cursor when two or more icons of the same priority exist. Alternatively, the icon that is frequently visited according to a past record is selected to be moved to the center of the cursor when two or more icons of the same priority exist.

In the display method of the present invention, the cursor range is a size of the cursor on the map image. Alternatively, the cursor range is an extended range created outside of the cursor on the map image where the extended range is coaxial with the center of the cursor. The size and shape of the extended range can be changed by an operation of the user. The center of the cursor is at a center of the map image displayed on the navigation system. In the alternative, the center of the cursor is shifted from the center of the map image.

Another aspect of the present invention is a display apparatus for a navigation system. The navigation system of the present invention is designed to help the user in viewing the information on the map image that is most relevant to the situation of the user. The navigation system redraws the map image when the map scale is changed in such a way that the most relevant icon is positioned at the center of a cursor on the map image, thereby preventing from loosing the sight of the icon of the most relevant to the user when zooming in the map image.

According to the present invention, the navigation system helps the user in viewing the information on the map image that is most relevant to the situation of the user. The navigation system redraws the map image when the map scale is changed in such a way that the most relevant icon is positioned at the center of the cursor on the map image so that the user will not lose sight of the most relevant icon when the map image is dramatically enlarged. The navigation system prioritizes an icon representing a particular object based on predetermined priority order and changes the position of the map image so that the icon of the highest priority comes to the center of the cursor when the map scale is changed. Thus, the icon of the highest priority always remains at the center of the cursor, thereby preventing from loosing the sight of the icon of the highest priority when zooming in the map image.

BRIEF DESCRIPTION OF THE DRAWINGS

FIGS. 4A-4C are schematic diagrams showing display examples of the navigation system in the present invention. FIG. 4A shows a cursor and several icons displayed on a map image. FIG. 4B shows an extended cursor range in addition to the cursor and several icons, FIG. 4C shows a situation where the map image is zoomed in from that of FIG. 4B.

FIG. 6A shows a cursor and several icons displayed on a map image and FIG. 6B shows a situation where the map image is zoomed out from the that of FIG. 6A.

FIG. 9A shows the map image before being zoomed in and FIG. 9B shows the map image after being zoomed in.

FIG. 10A shows a further enlarged cursor range of circular shape and FIG. 10B shows an enlarged cursor rage of rectangle.

FIG. 11A shows the map image before being zoomed in and FIG. 11B shows the map image after being zoomed in.

DETAILED DESCRIPTION OF THE INVENTION

The present invention will be described in detail with reference to the accompanying drawings. The navigation system of the present invention is designed to help the user in viewing the information on the map image that is most relevant to the situation of the user. The navigation system redraws the map image when the map scale is changed in such a way that the most relevant icon is positioned at the center of a cursor on the map image, thereby preventing from loosing the sight of the icon of the most relevant to the user when zooming in the map image.

Preferably, the cursor center is the same as the center of the monitor screen (map screen) so that the icons of the objects surrounding the most relevant icon can also be effectively observable. However, the cursor can be positioned anywhere on the screen by the operation of the user and the most relevant icon within a predetermined range of the cursor is positioned at the center of the cursor when zooming in the map image. Accordingly, when the map scale is changed, especially when the map image is enlarged, in a large degree, the most relevant icon remains at the center area of the monitor screen or the center area of the cursor even though the cursor is away from the center of the display screen.

To achieve this, the navigation system predefines priority of objects such as points of interest, traffic incidents, a destination point, road segments, city names, etc. Alternatively, the user is able to define the priority of objects based on the user's situation and needs. Based on the priority of the objects, the navigation system positions the icon representing the object of the highest priority at the center of the cursor when the map image is zoomed in. Thus, even when the icon of the highest or higher priority is not exactly at the center of the cursor, the icon of such high priority is positioned at the center area of the cursor when the map image is enlarged.

Figure 3:
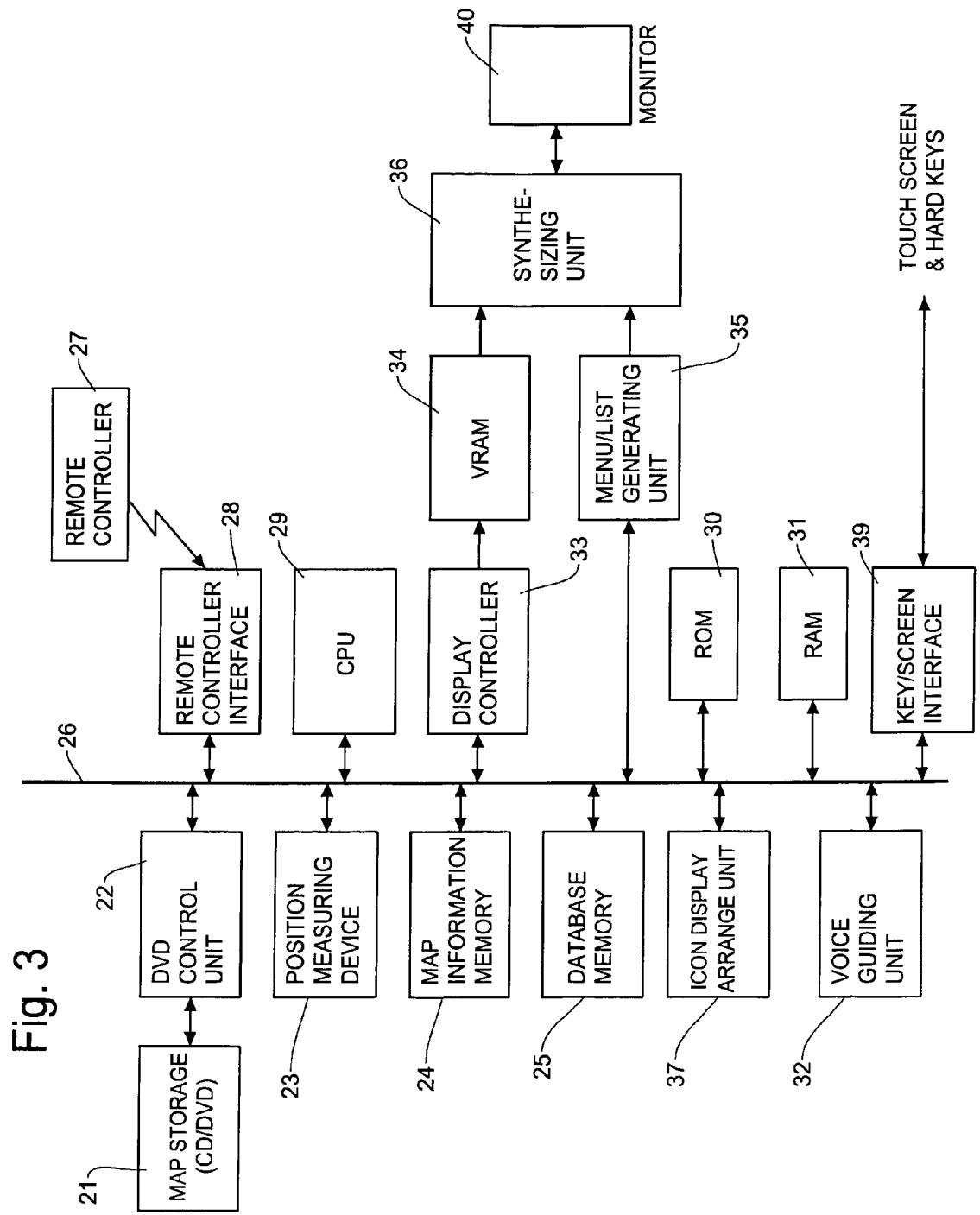
FIG. 3 is a block diagram showing an example of structure in the vehicle navigation system for implementing the present invention.

FIG. 3 shows an example of structure of a vehicle navigation system implementing the present invention. It should be noted that the present invention can also be applied to a portable navigation device such as a one implemented by a PDA (personal digital assistant) device or other hand-held devices. In the block diagram of FIG. 3, the navigation system includes a map storage medium 21 such as a CD-ROM, DVD, hard disc or other storage means (hereafter "DVD") for storing map information, a DVD control unit 22 for a controlling an operation for reading the map information from the DVD, a position measuring device 23 for measuring the present vehicle position. The position measuring device 23 has a vehicle speed sensor for detecting a moving distance, a gyro for detecting a moving direction, a microprocessor for calculating a position, a GPS (Global Positioning System) receiver, and etc.

The block diagram of FIG. 3 further includes a map information memory 24 for storing the map information which is read out from the DVD 21, a database memory 25 for storing database information such as point of interest (POI) information which is read out from the DVD 21, a remote controller 27 for executing a menu selection operation, an enlarge/reduce operation, a destination input operation, etc. and a remote controller interface 28. The navigation system may include various other input methods to achieve the same and similar operations done through the remote controller.

The navigation system further includes a bus 26 for interfacing the above units in the system, a processor (CPU) 29 for controlling an overall operation of the navigation system, a ROM 30 for storing various control programs, a RAM 31 for storing a processing result such as a guide route, a voice interface and guiding unit 32 for voice communication interface and spoken instructions, a display controller 33 for generating map image (a map guide image and an arrow guide image) on the basis of the map information, a VRAM (video RAM) 34 for storing images generated by the display controller, a menu/list generating unit 35 for generating menu image/various list images, a synthesizing unit 36, an icon display control unit 37, a monitor (display) 40, and a key and screen interface 39 for interfacing with various other input means such as hard keys and a joystick on a panel of the navigation system, and the like. The icon display arrange unit 37 controls how the navigation system display icons and the like on the display screen.

In the preferred embodiment, the map storage medium 21 such as a hard disk or a DVD stores the map data including road segments data, polygon data, points of interest data, etc. The CPU 29 controls an overall operation of the present invention for adjusting the position of the selected (prioritized) icon at the center of the cursor when zooming in the map image. Namely, when a request for changing the map scale is initiated by the user, the CPU 29 determines whether icons of predefined object exist in a cursor range on the map image.

If there is an icon in the cursor range, the CPU 29 changes the position of the map image in such a way that the icon in the cursor range comes to the center of the cursor based on the position data of the object that is represented by the icon. Thus, when the map image is zoomed in, the icon remains at the center of the cursor. If there are two or more icons in the cursor range, the CPU 29 detects an icon of the highest priority according to the predetermined priority order of the objects.

Then, the CPU 29 retrieves the position (longitude and latitude) data of the highest priority object. The CPU 29 shifts the position of the map image with use of the position data of the highest priority object so that the icon of the highest priority comes to the center of the cursor. Thus, when the map image is zoomed in, the icon of the highest priority object remains at the center of the cursor, thereby preventing from loosing the sight of the icon of the most relevant to the user when zooming in the map image.

Figure 4A:
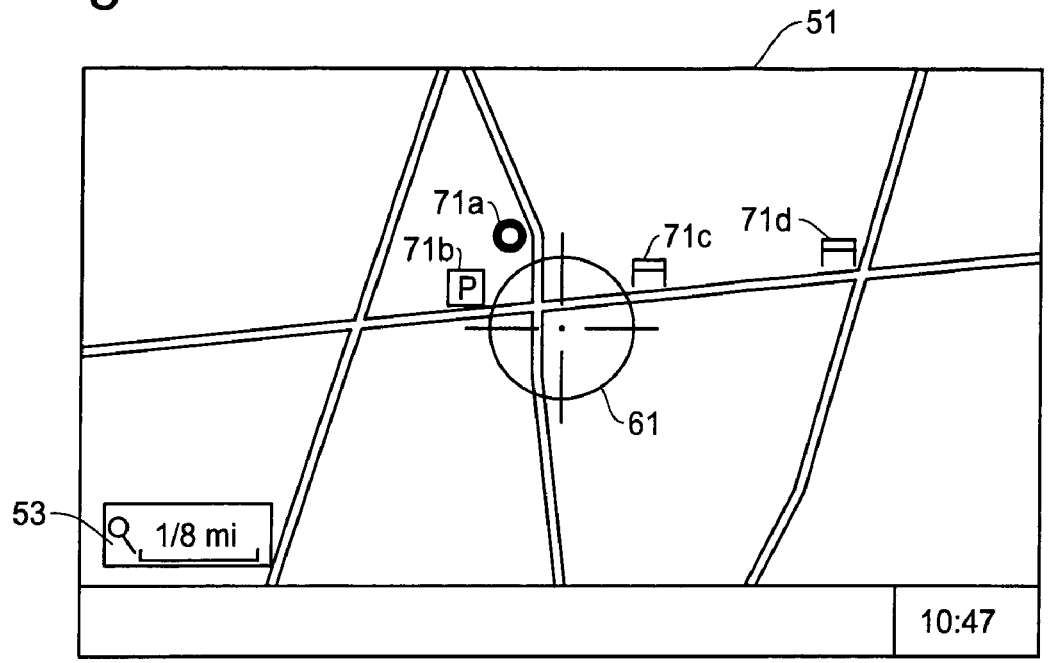
Figure 4B:
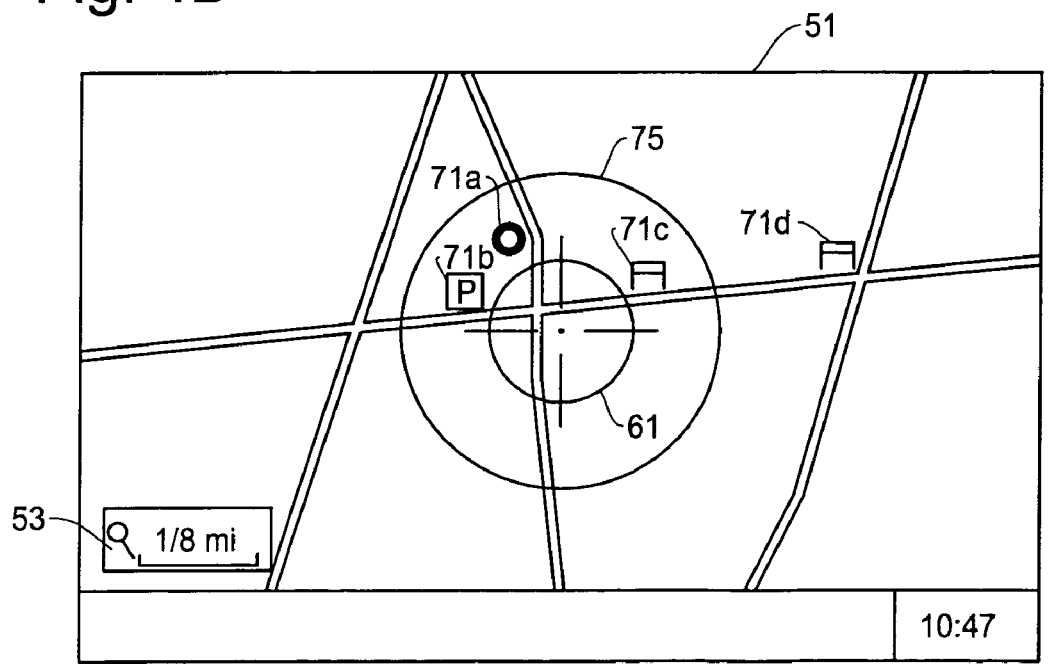

FIGS. 4A-4C show display examples illustrating the procedure of redrawing a map image in the navigation system of the present invention. FIG. 4A shows an example of the initial stage of the map image before being zoomed in. As shown, in this example, a cursor 61 is located at the center of the screen, and several icons are located along the roads. The cursor 61 can be moved to anywhere on the screen, however, it is preferable to maintain the position of the cursor 61 at the center of the screen because, in the present invention, the most relevant icons will be positioned at the center of the cursor 61 when zooming in the map image.

FIG. 4B is a display example that is identical to one shown in FIG. 4A except that an extended cursor range 75 is shown in FIG. 4B. In the case where the circle of the cursor 61 is not large enough, i.e., to include the desired icons within the icon 61, an extended cursor range 75 is preferably used for carrying out present invention. The extended cursor range 75 is a predetermined range that is larger than the cursor 61 and is coaxial with the cursor 61 with respect to cursor center. Although the extended cursor range 75 is circular in this example, other shapes may also be advantageously used. Moreover, the size of the cursor range may vary so that the navigation system may find a highest priority object from a larger area or a smaller area. The extended cursor range 75 may or may not be shown on an actual display.

The navigation system will determine if one or more icons that representing predetermined objects such as POIs, traffic incidents, destination point, etc. exist in the extended cursor range 75. In this example, a destination icon 71a, a point of interest icon 71b, and a traffic incident icon 71c are located within the extended cursor range 75. If two or more icons exist in the extended cursor range 75 such as in this case, the navigation system will find an icon representing the object of the highest priority which is predetermined by the system or the user.

When the object of the highest priority is determined, the navigation system detects the position of the object based on, for example, latitude/longitude data of the object. When the user zooms in the map image in the situation of FIG. 4B, the navigation system moves the map image so that the object of the highest priority comes to the center of the cursor 61 and displays the enlarged map image as shown in FIG. 4C. The map image in FIG. 4C is magnified in response to the user's command so that the map scale is now 1/32 miles per unit length rather than 1/8 miles per unit length in FIG. 4B.

Figure 1:
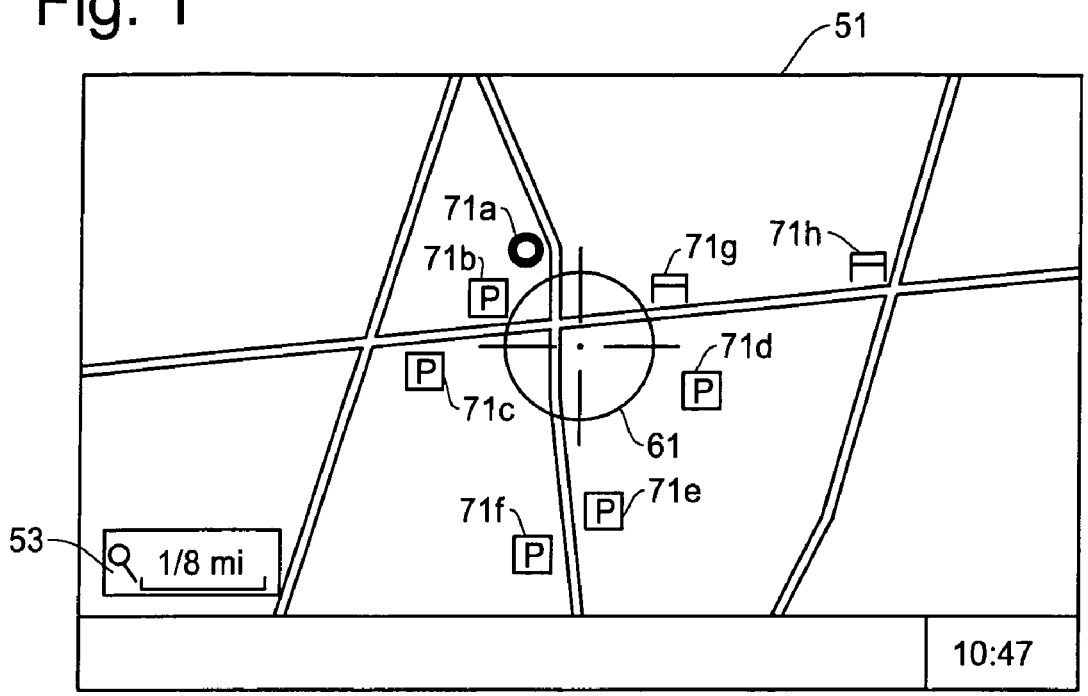
FIG. 1 is a display example of a map image associated with a conventional navigation system where a cursor and several icons are displayed on the map.
Figure 2:
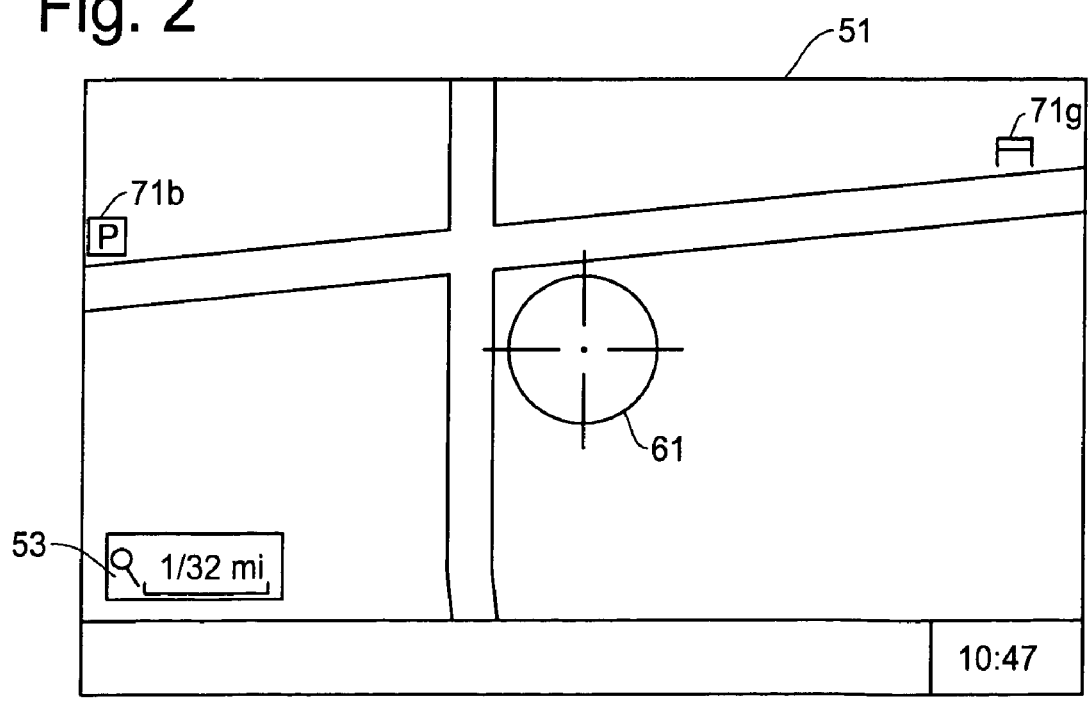
FIG. 2 is a display example associated with the conventional navigation system wherein the map image is zoomed in from the display example of FIG. 1.

In this example, the destination icon 71a is positioned at the center of the cursor 61 (center of the display screen) in contrast to the display example in the conventional navigation system shown in FIG. 2 where the sight of the destination icon is lost. In other words, the destination icon 71a is preselected as the highest priority because the destination is likely to be the most important object among the icons in the extended cursor range 75. The priority of such icons (objects) is predetermined by the initial setting of the navigation system. Alternatively, the user can freely change the priority depending on the user's particular needs and situations.

Figure 5:
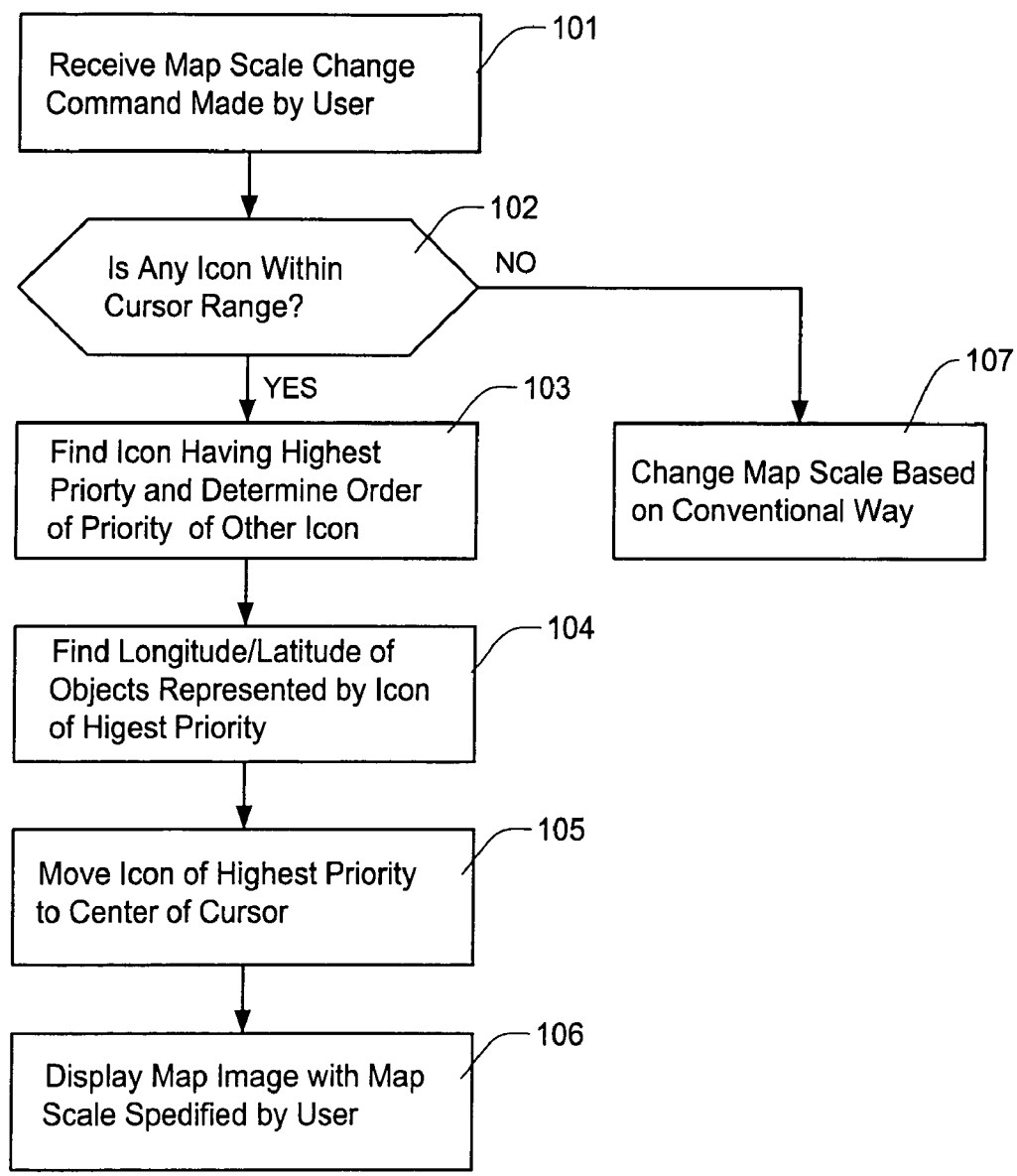
FIG. 5 is a flow chart showing the basic operational process of the present invention for determining an order of priority of the objects and redrawing a map image on the screen of the navigation system.

FIG. 5 is a flow chart showing the basic steps of redrawing a map image in the present invention. First, the user changes the map scale by, for example, a remote controller, a touch screen, or a voice command at step 101. The navigation system determines if any relevant icon or object exists within a cursor range in step 102, which corresponds to the display screen of FIG. 4B. The cursor range can be the same as the cursor circle or an enlarged circle (extended cursor range 75) coaxial with the center of the cursor 61 specially created for this operation.

In the step 102, if a relevant icon does not exist in a cursor range, the navigation system will redraw the map image in the same way as a conventional method at step 107 where the map image is either enlarged or shrunken with respect to the cursor center. If at least one relevant icon exists, the navigation system will determine the most relevant icon by comparing the icons in step 103. In the display example of FIG. 4B, the destination icon 71*a*, the POI icon 71*b* and the traffic incident icon 71*c* are within the extended cursor range 75.

Specifically, the navigation system finds the highest priority object within the extended cursor range 75. The priority of the object is predetermined either by the navigation system or the user's operation as will be explained later with reference to FIG. 7. In the example of FIGS. 4A-4C, the highest object is the destination point, i.e., the icon 71*a*. When the navigation system finds the highest priority object within the cursor range, the navigation system finds the position (longitude and latitude) data of the highest priority object in step 104.

Thus, at step 105, based on the position data of the highest priority object, the navigation system rearranges the map image so that the highest priority object is positioned at the center of the cursor. In other words, the navigation system moves the map image so that the icon of the highest priority object comes to the center of the cursor 61. In the example of FIGS. 4A-4C, the center of the cursor 61 is also the center of the display screen 51.

Accordingly, in step 106, the navigation system displays the map image of the specified map scale where the highest priority object is at the center of the cursor. This process corresponds to the display example of FIG. 4C where the destination icon 71*a* is at the center of the cursor 61 when the map image is enlarged. As in the foregoing, in the present invention, the important icons remain within the center area of the display screen when the map image is substantially enlarged even when such icons are originally not located on the center area before being enlarged.

Figure 6A:
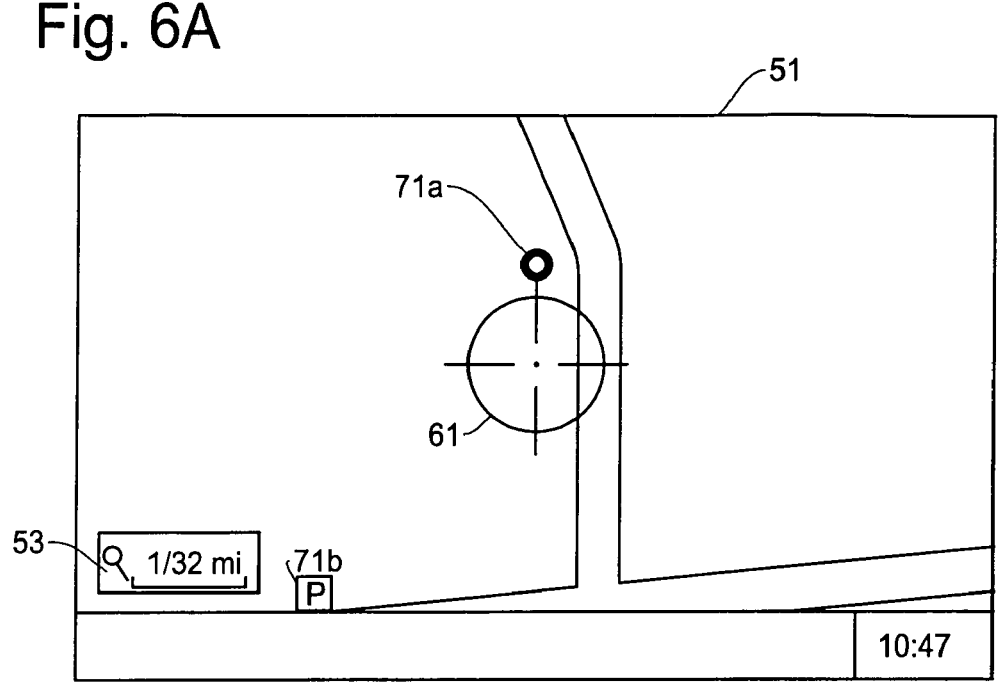
FIGS. 6A-6B are schematic diagrams showing display examples of the navigation system in the present invention where
Figure 6B:
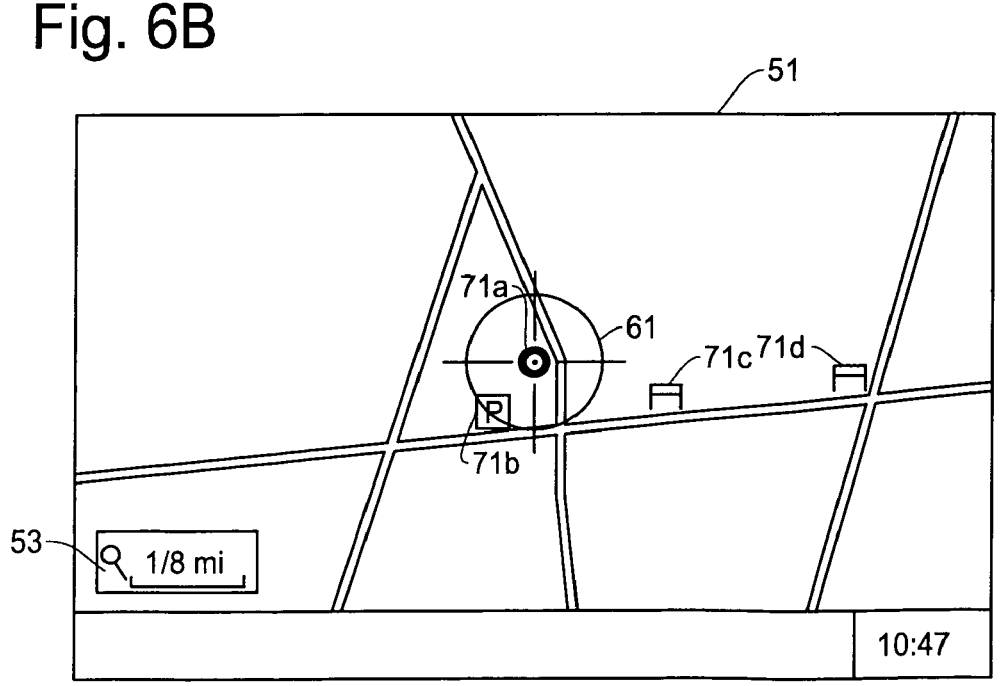

In the above example, the user zoomed in the map image to enlarge the map image on the monitor screen. The navigation system in the present invention can also be effectively used when the user zooms out the map image. FIG. 6A and FIG. 6B are display examples showing the steps of zooming out a map image in the present invention. FIG. 6A is a display example showing the initial map image which is an enlarged view of relatively small area. The point of interest icon 71*b* and the destination icon 71*a* are shown on the map image. FIG. 6B is a display example as a result of zooming out the map image from the display of FIG. 6A. As shown, the destination icon 71*a* comes almost at the center of the cursor 61 because the navigation system now displays the map screen of substantially larger area than that of the display example of FIG. 6A.

Figures 7, 8:
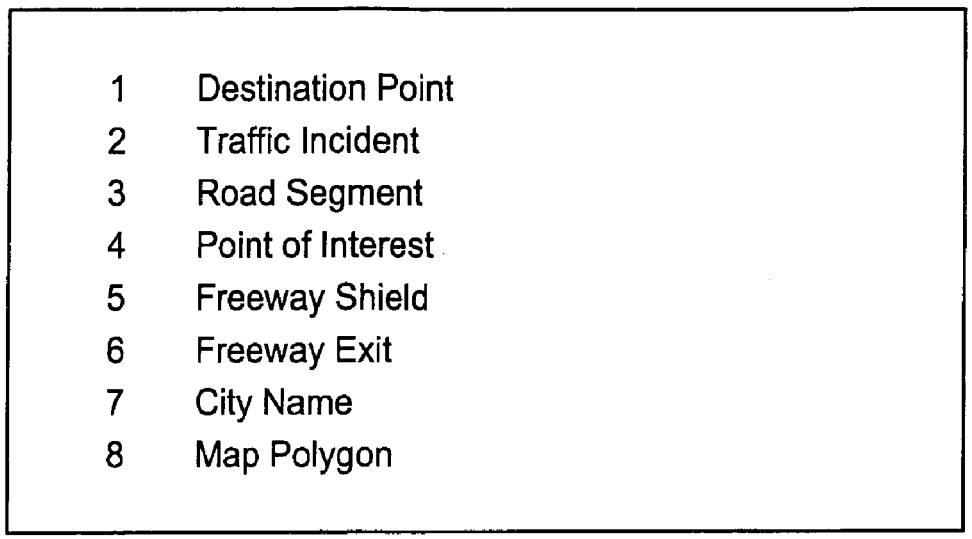
FIG. 7 is a schematic diagram showing a priority list for a navigation system of the present invention listing categories of object in the order of priority.
FIG. 8 is a schematic diagram showing a display example of the present invention in which the priority order of objects in the priority list of FIG. 7 can be freely changed by the user.

FIG. 7 is the list of objects arranged in the order of preference (priority) in the present invention. As noted above, these objects are represented by the corresponding icons on the map image. In this example, eight (8) categories of objects are listed in the order of preference which is preset in the navigation system. However, the navigation system under the present invention may have more or less objects according to the need. In this example, the destination point has the highest priority and the traffic incident is the second highest. Such an order of the preference or priority can be freely changed by the user as will be described later.

An example of a display of the navigation system for changing the order of the priority of the objects is shown in FIG. 8. A display 55 includes a list of object with the current order of priority and up/down arrow keys which allow the user to change the order of the priority. An order indicator 59 shows the current order number of the objects in the list. In this example, eight (8) objects are listed as an illustration purpose. When changing the priority order, the user operates up arrow keys 57*a* and down arrow keys 57*b* in the screen 55.

For example, when the user wishes to change the traffic incident to be the highest priority object, the user can press the up arrow key 57*a* of the traffic incident to move the traffic incident to the first order. Then, the destination point at the top will automatically move down to the second order. Likewise, the user may demote the order of the road segment object by pressing the down arrow key 57*b* for the road segment object.

In the case where a plurality of objects with the same level of priority exit within the cursor range, the navigation system may provide additional rules to determine the priority of each object. Typically, the navigation system determines the priority among the objects of the same order of priority based on the proximity of objects to the center of the cursor. For example, if two or more POIs of the same type, such as restaurant, are located within the cursor range, the POI that is closest to the cursor center will have the highest priority. Alternatively, in such a case, the user may predefine the priority so that a particular type of restaurant has the highest priority.

Further, when there are two or more traffic incidents, the navigation system may prioritize based on the level of seriousness in the traffic incidents. For example, the navigation system or the user may prioritize an automobile accident over freeway exit closure because an traffic accident is usually more serious than the closure of a freeway exit through a travel to a destination. It is also feasible to prioritize four-lane highways over two-lane highways.

Figure 9A:
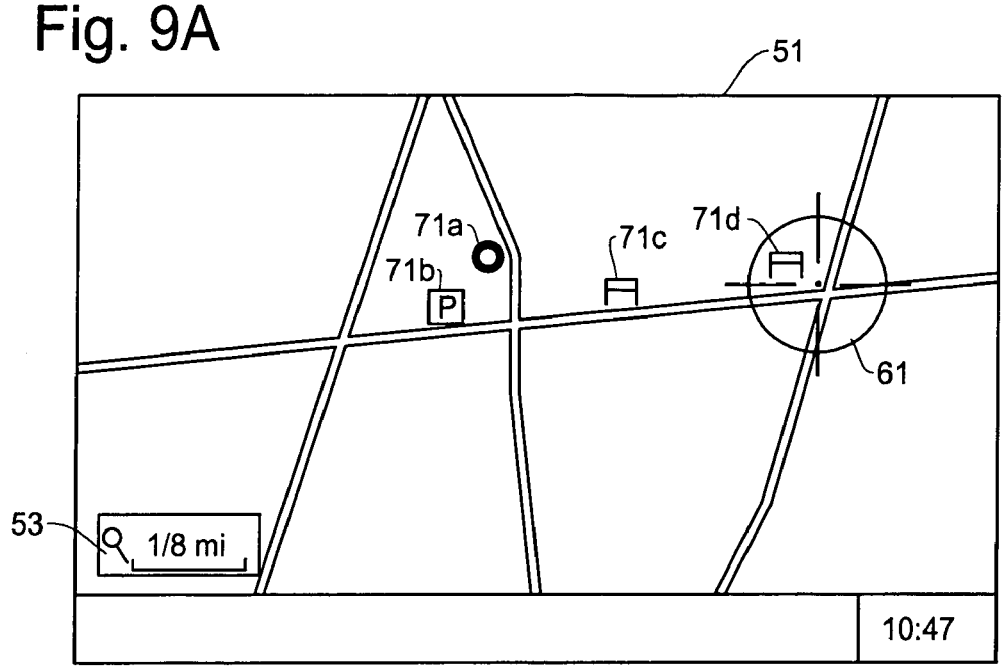
FIGS. 9A-9B are schematic diagrams showing display examples of a navigation system in the present invention where the position of the cursor is shifted from the center of the display screen where
Figure 9B:
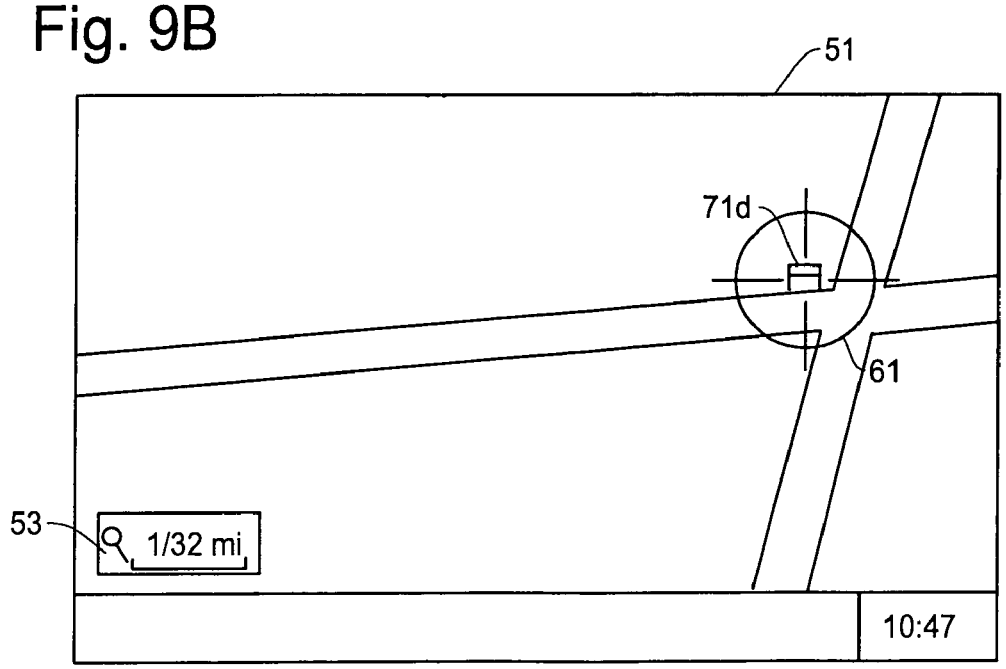

FIGS. 9A-9B are schematic diagrams showing display examples where the cursor 61 is located away from the center of the display screen before zooming in the map image. As is well known in the art, the user can freely change the position of the cursor 61 on the screen. In such a case, the map image is enlarged with reference to the center of the cursor 61, i.e., the cursor 61 remains at the same position on the screen after zooming in. In this example, the traffic incident icon 71*d* is in the range of the cursor 61 in FIG. 9A. Suppose the user operates a zoom-in key when the cursor 61 is in the position shown in FIG. 9A, the navigation system performs the map redrawing operation noted above with respect to the cursor center.

Namely, the navigation system checks whether any icons of predefined object exist in the cursor range on the map image. If there is an icon in the cursor range such as the traffic incident icon 71*d*, the navigation system changes the position of the map image in such a way that the icon 71*d* in the cursor range comes to the center of the cursor 61 based on the position data of the traffic incident represented by the icon 71. Thus, when the map image is zoomed in, the icon 71*d* remains at the center of the cursor 61 as shown in FIG. 9B where the cursor 61 also remains almost the same position as that of FIG. 9A.

If there are two or more icons in the cursor range in the situation of FIGS. 9A and 9B, the navigation system detects an icon of the highest priority according to the predetermined order of the objects. Then, the navigation system retrieves the position (longitude and latitude) data of the highest priority object. The navigation system shifts the map image with use of the position data of the highest priority object so that the icon of the highest priority comes to the center of the cursor 61. Thus, when the map image is enlarged, the icon of the highest priority object remains at the center of the cursor 61 even though the cursor 61 is not at the center of the display.

Figure 10A:
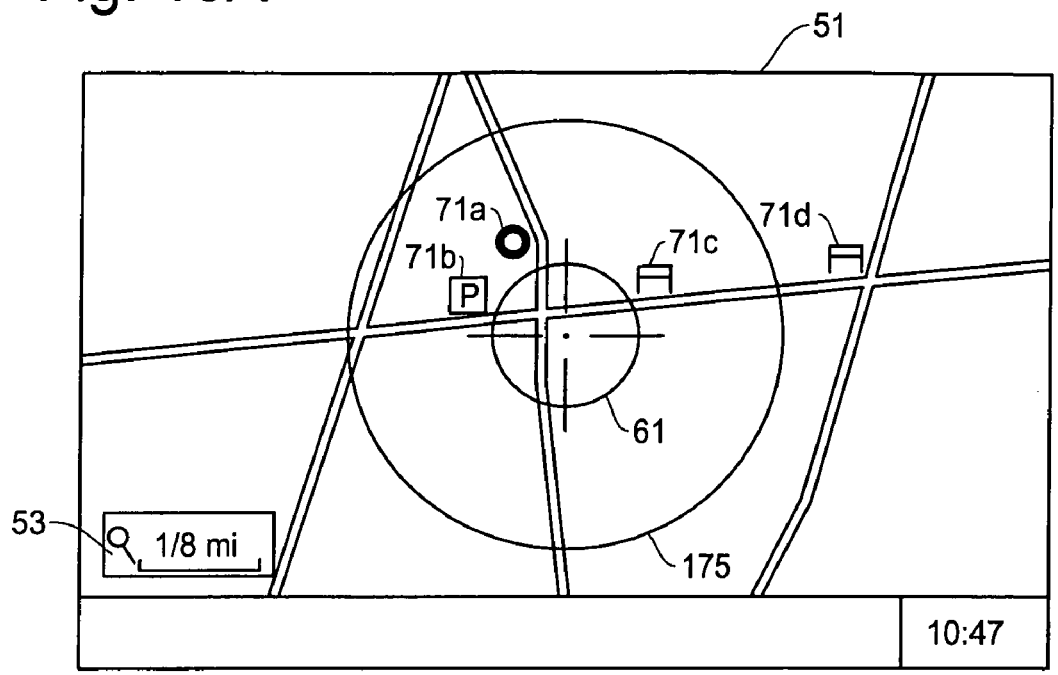
FIGS. 10A-10B are schematic diagrams showing display examples of a navigation system in the present invention where types of extended cursor range are used where
Figure 10B:
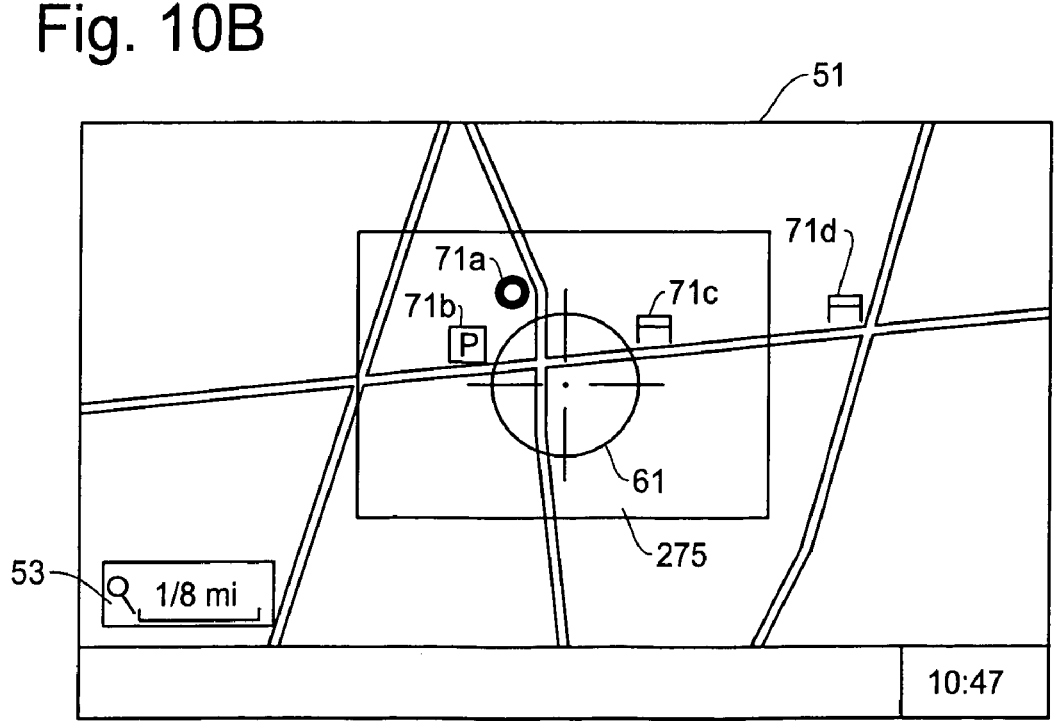

FIGS. 10A-10B show examples of extended cursor range for use in the present invention. FIG. 10A shows a display example having an extended cursor range 175 that is circular and larger than that shown in the previous examples. FIG. 10B shows a display example having an extended cursor range 275 that is rectangular and larger than that shown in the previous examples. In both examples, the center of the extended cursor range is the same as the center of the cursor 61. Alternatively, a cursor range smaller than the cursor 61 can also be implemented to the navigation system of the present invention. The navigation system may allow the user to set the size of the cursor range.

Figure 11A:
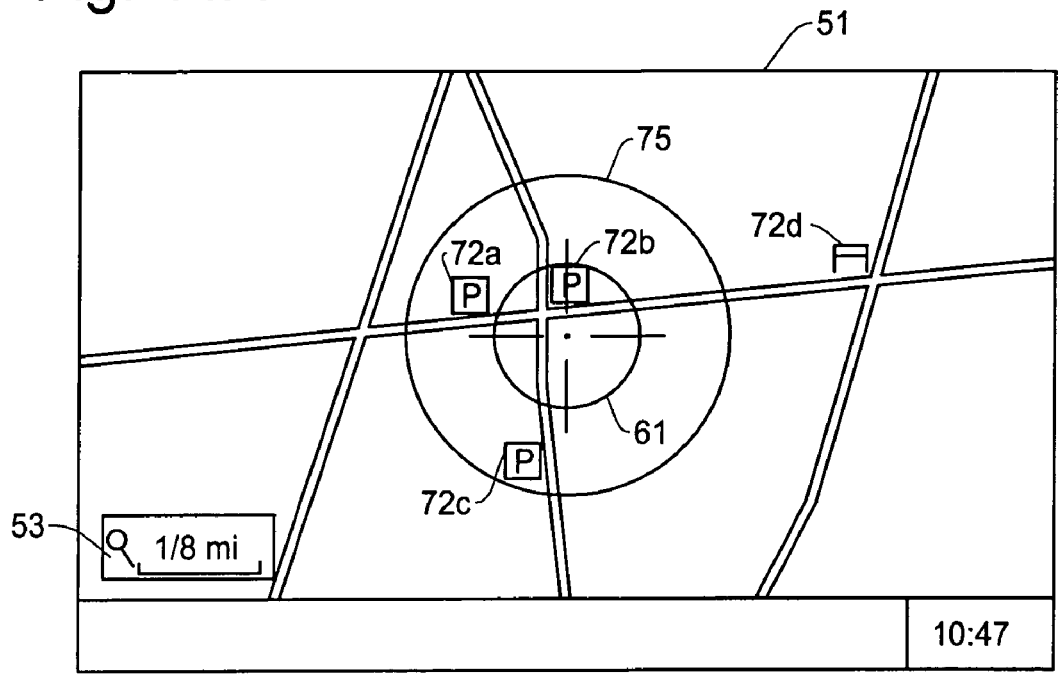
FIGS. 11A-11B are schematic diagrams showing display examples of a navigation system in the present invention where a plurality of icons representing the same category are located within the cursor range, where
Figure 11B:
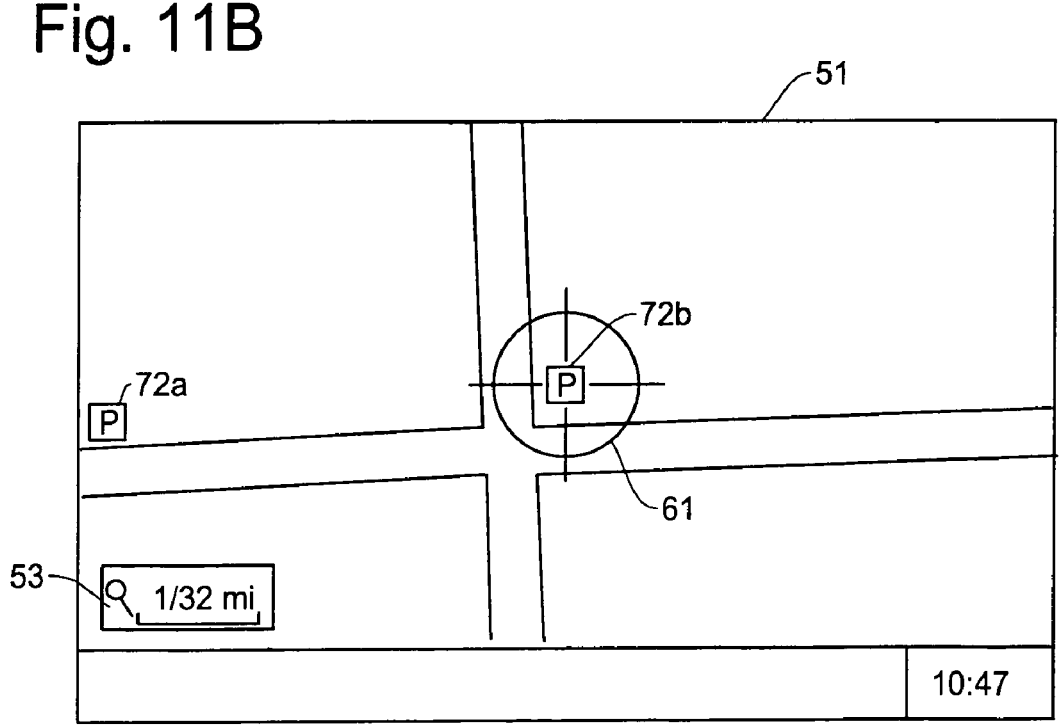

An example of a situation wherein two or more icons of the same priority are located within the extended cursor range 75 is shown in the display example in FIGS. 11A and 11B. In this example, icons 72a, 72b and 72c indicating the points of interest (POI) of same types (ex. restaurant) exist within the extended cursor range 75. In this case, the navigation system may select the point of interest icon 72b as the highest priority object since it is closest to the center of the cursor 61. In the alternative, the navigation system may judge the highest priority by the user's preference based on, for example, the past record of destination by the same user.

For example, it is assumed that the point of interest icon 72a is a hamburger shop and the point of interest icon 72b and 72c are pizza parlors, and that the user has set the preference to prioritize hamburger shops over pizza parlors. Then, the navigation system determines that the point of interest 72a is the highest priority object. Alternatively, even if the user has not set the preference, if the past record stored in the navigation system shows that the user has visited pizza parlors more frequently than hamburger shops, the navigation system determines that the point of interest icon 72b has the highest priority since it represents the pizza parlor and is closer to the cursor center.

As has been described above, according to the present invention, the navigation system helps the user in viewing the information on the map image that is most relevant to the situation of the user. The navigation system redraws the map image when the map scale is changed in such a way that the most relevant icon is positioned at the center of the cursor on the map image so that the user will not lose sight of the most relevant icon when the map image is dramatically enlarged. The navigation system prioritizes an icon representing a particular object based on predetermined priority order and changes the position of the map image so that the icon of the highest priority comes to the center of the cursor when the map scale is changed. Thus, the icon of the highest priority always remains at the center of the cursor, thereby preventing from loosing the sight of the icon of the highest priority when zooming in the map image.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying icons on a map image when a map scale is changed, comprising the following steps of:

receiving a request for changing a scale of a map image on a navigation system so that the map image should be displayed by a requested map scale;

determining whether an icon representing a relevant object exists within a cursor range defined by a cursor on the map image;

selecting an icon representing a highest priority object within the cursor range based on a predetermined order of priority;

retrieving position data indicating a location of the highest priority object from map data; and adjusting a position of the map image so that the selected icon representing the highest priority object comes to a center of the cursor based on the position data, and displaying the map image with the requested map scale.

2. A method for displaying icons on a map image as defined in claim 1, wherein the priority of objects represented by the icons is predetermined by the navigation system or by an operation of a user.

3. A method for displaying icons on a map image as defined in claim 1, wherein the step of selecting the icon includes a step of selecting an icon that is closest to the center of the cursor when two or more icons of the same priority exist within the cursor range.

4. A method for displaying icons on a map image as defined in claim 1, wherein the step of selecting the icon includes a step of selecting an icon that is most relevant to a trip to a destination when two or more icons of the same priority exist within the cursor range.

5. A method for displaying icons on a map image as defined in claim 1, wherein the step of selecting the icon includes a step of selecting an icon that is more frequently visited over an icon that is less frequently visited according to a past record when two or more icons of the same priority exist within the cursor range.

6. A method for displaying icons on a map image as defined in claim 1, wherein the cursor range is a size of the cursor on the map image.

7. A method for displaying icons on a map image as defined in claim 1, wherein the cursor range is an extended range created outside of the cursor on the map image where the extended range is coaxial with the center of the cursor.

8. A method for displaying icons on a map image as defined in claim 7, wherein a size and shape of the extended range can be changed by an operation of a user.

9. A method for displaying icons on a map image as defined in claim 1, wherein the center of the cursor is at a center of the map image displayed on the navigation system.

10. A method for displaying icons on a map image as defined in claim 1, wherein the center of the cursor is shifted from a center of the map image displayed on the navigation system.

11. An apparatus for displaying icons on a map image when a map scale is changed, comprising:

means for receiving a request for changing a scale of a map image on a navigation system so that the map image should be displayed by a requested map scale;

means for determining whether an icon representing a relevant object exists within a cursor range defined by a cursor on the map image;

means for selecting an icon representing a highest priority object within the cursor range based on a predetermined order of priority;

means for retrieving position data indicating a location of the highest priority object from map data; and means for adjusting a position of the map image so that the selected icon representing the highest priority object comes to a center of the cursor based on the position data, and for displaying the map image with the requested map scale.

12. An apparatus for displaying icons on a map image as defined in claim 11, wherein the priority of objects represented by the icons is predetermined by the navigation system or by an operation of a user.

13. An apparatus for displaying icons on a map image as defined in claim 11, wherein the means for selecting the icon includes means for selecting an icon that is closest to the center of the cursor when two or more icons of the same priority exist within the cursor range.

14. An apparatus for displaying icons on a map image as defined in claim 11, wherein the means for selecting the icon includes means for selecting an icon that is most relevant to a trip to a destination when two or more icons of the same priority exist within the cursor range.

15. An apparatus for displaying icons on a map image as defined in claim 11, wherein the means for selecting the icon includes means for selecting an icon that is more frequently visited over an icon that is less frequently visited according to a past record when two or more icons of the same priority exist within the cursor range.

16. An apparatus for displaying icons on a map image as defined in claim 11, wherein the cursor range is a size of the cursor on the map image.

17. An apparatus for displaying icons on a map image as defined in claim 11, wherein the cursor range is an extended range created outside of the cursor on the map image where the extended range is coaxial with the center of the cursor.

18. An apparatus for displaying icons on a map image as defined in claim 17, wherein a size and shape of the extended range can be changed by an operation of a user.

19. An apparatus for displaying icons on a map image as defined in claim 11, wherein the center of the cursor is at a center of the map image displayed on the navigation system.

20. An apparatus for displaying icons on a map image as defined in claim 11, wherein the center of the cursor is shifted from a center of the map image displayed on the navigation system.

* * * * *